United States Patent [19]

Date et al.

[11] 3,830,205
[45] Aug. 20, 1974

[54] AUXILIARY CHAMBER AND TORCH NOZZLE FOR INTERNAL COMBUSTION ENGINE

[75] Inventors: Tasuku Date, Tokyo; Shizuo Yagi, Saitama-ken, both of Japan

[73] Assignee: Honda Giken Kogyo Kabushika Kaisha, Tokyo, Japan

[22] Filed: Dec. 29, 1972

[21] Appl. No.: 319,887

[30] Foreign Application Priority Data

Jan. 11, 1972 Japan.............................47-4973

[52] U.S. Cl. ....... 123/32 ST, 123/32 SP, 123/191 S
[51] Int. Cl. ... F02b 19/10, F02b 19/16, F02b 19/18
[58] Field of Search....................... 123/32 ST, 32 SP

[56] References Cited
UNITED STATES PATENTS

| | | | |
|---|---|---|---|
| 2,173,081 | 9/1939 | Barkeij | 123/32 ST |
| 2,184,357 | 12/1939 | Mallory | 123/32 ST |
| 2,690,741 | 10/1954 | Broderson | 123/32 ST |
| 2,758,576 | 8/1956 | Schlamann | 123/32 ST |
| 3,207,141 | 9/1965 | Freeman | 123/32 ST |
| 3,230,939 | 1/1966 | Goossak | 123/32 ST |
| 3,508,530 | 4/1970 | Clawson | 123/32 ST |
| 3,543,736 | 12/1970 | Suzuki | 123/32 ST |
| 3,659,564 | 5/1972 | Suzuki | 123/32 ST |

*Primary Examiner*—Laurence M. Goodridge
*Assistant Examiner*—Ronald B. Cox
*Attorney, Agent, or Firm*—Lyon & Lyon

[57] ABSTRACT

An internal combustion engine has a main combustion chamber bounded on one side by a piston and also has an auxiliary combustion chamber connected by a torch nozzle to the main combustion chamber. The volume of the auxiliary chamber is from 5 percent to 12 percent of the total combined volume of the main chamber and the auxiliary chamber. The cross sectional area of the torch nozzle is from 0.04 to 0.20 square centimeter for each cubic centimeter of volume of the auxiliary combustion chamber.

3 Claims, 1 Drawing Figure 3,830,205
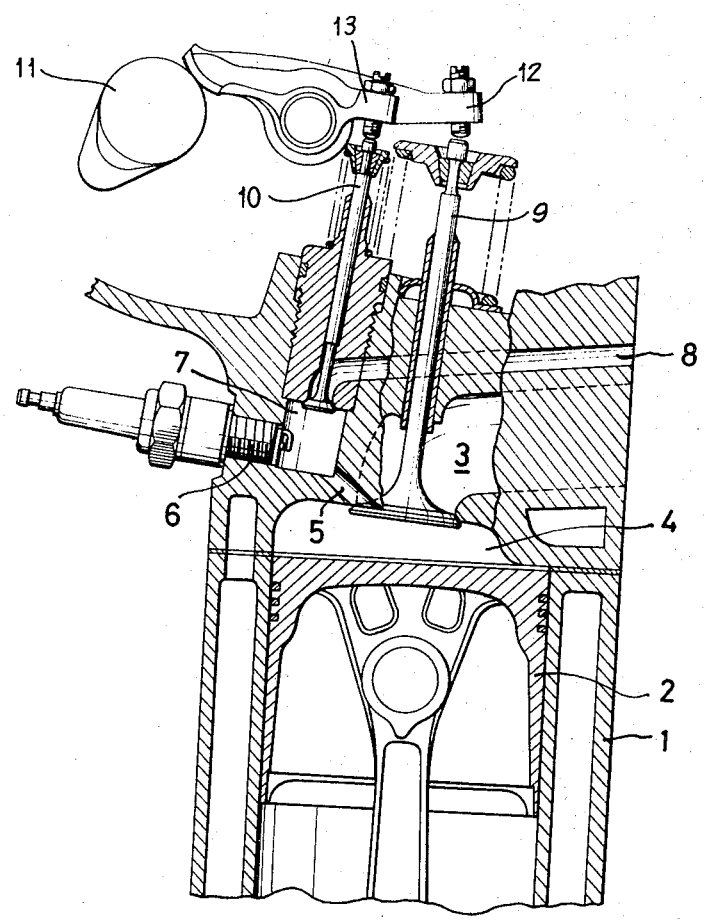

AUXILIARY CHAMBER AND TORCH NOZZLE FOR INTERNAL COMBUSTION ENGINE

This invention relates to internal combustion engines having a main combustion chamber supplied with lean combustible mixture and an auxiliary combustion chamber supplied with rich combustible mixture. A spark plug associated with the auxiliary combustion chamber ignites the rich mixture to cause a flame to project through a torch nozzle connecting the chambers to ignite the lean mixture in the auxiliary chamber.

It has been found that if the auxiliary combustion chamber is too large with respect to the main combustion chamber, the energy of the flame produced within the main combustion chamber is too strong, resulting in abnormal firing and knocking in the main combustion chamber, and fuel consumption is increased. On the other hand, if the auxiliary combustion chamber is too small as compared to the main combustion chamber, the flame energy is so weak that the lean mixture within the main combustion chamber does not burn completely.

It has also been determined that if the torch nozzle communicating between the chambers is too large in cross sectional area, as compared to the volume of the auxiliary chamber, the rich mixture within the auxiliary chamber is drawn out into the main chamber in the course of the piston's suction stroke, and then the lean mixture within the main chamber is moved into the auxiliary chamber in the course of the compression stroke. This dilutes the rich mixture in the auxiliary chamber with the result that it becomes difficult to produce a strong flame in the auxiliary chamber. If, on the other hand, the torch nozzle is too small in cross sectional area, as compared to the volume of the auxiliary chamber, the interior of the auxiliary chamber retains the desired rich mixture but the resultant flame projects through the torch nozzle into the main chamber for a relatively long duration, with the result that abnormal firing and knocking may occur.

It has been found that the difficulties are avoided when the volume of the auxiliary combustion chamber is from 5 percent to 12 percent of the total volume of the main chamber and auxiliary chamber, and the cross sectional area of the torch nozzle is from 0.04 to 0.20 square centimeter per cubic centimeter of volume of the auxiliary combustion chamber.

The drawing shows a preferred embodiment of this invention.

Referring to the drawing, the body 1 of the internal combustion engine contains a piston 2 which cooperates with walls on the body to form a main combustion chamber 4. A relatively lean combustible mixture is supplied to the chamber 4 through valved inlet passage 3. Walls of the engine form an auxiliary combustion chamber 7 which is in communication with the main combustion chamber 4 through a torch nozzle 5. A spark plug 6 is positioned to ignite a rich combustible mixture in the auxiliary combustion chamber 7. This rich mixture is delivered to the auxiliary chamber through the valved inlet passage 8. Proper combustion is achieved when the volume of the auxiliary chamber is from 5 percent to 12 percent of the total combined volume of the main chamber 4 and the auxiliary chamber 7, measured when the piston 2 is at the top dead center position illustrated. The cross sectional area of the torch nozzle 7 is from 0.04 to 0.20 square centimeter for each cubic centimeter of volume of the auxiliary combustion chamber 7.

The valves 9 and 10 for the inlet passage 3 and 8, respectively, are operated from cam shaft 11 through rocker arms 12 and 13.

Having fully described our invention, it is to be understood that we are not to be limited to the details herein set forth but that our invention is of the full scope of the appended claims.

We claim:

1. In an internal combustion engine, the combination of: walls including a movable piston forming a main combustion chamber, walls forming an auxiliary combustion chamber, a torch nozzle establishing communication between said chambers, the cross sectional area of the torch nozzle being from 0.04 to 0.20 square centimeter for each cubic centimeter of volume of the auxiliary combustion chamber, and greater than approximately 0.24 square centimeter.

2. In an internal combustion engine, the combination of: walls including a movable piston forming a main combustion chamber, walls forming an auxiliary combustion chamber, a torch nozzle establishing communication between said chambers, the volume of the auxiliary chamber being from 5 percent to 12 percent of the total combined volume of the main chamber and the auxiliary chamber, and the cross sectional area of the torch nozzle being from 0.04 to 0.20 square centimeter for each cubic centimeter of volume of the auxiliary combustion chamber, and greater than approximately 0.24 square centimeter.

3. In an internal combustion engine, the combination of: walls including a movable piston forming a main combustion chamber, walls forming an auxiliary combustion chamber, a torch nozzle establishing communication between said chambers, means for introducing a relatively lean mixture into the main combustion chamber, means for introducing a relatively rich mixture into the auxiliary combustion chamber, the volume of the auxiliary chamber being from 5 percent to 12 percent of the total combined volume of the main chamber and the auxiliary chamber, and the cross sectional area of the torch nozzle being from 0.04 to 0.20 square centimeter for each cubic centimeter of volume of the auxiliary combustion chamber, and greater than approximately 0.24 square centimeter.

* * * * *